US009934622B2

United States Patent
Rajakondala

(10) Patent No.: US 9,934,622 B2
(45) Date of Patent: Apr. 3, 2018

(54) TELEMATICS DEVICES AND METHODS FOR VEHICLE IGNITION DETECTION

(71) Applicant: Laird Technologies, Inc., Earth City, MO (US)

(72) Inventor: Balachander Rajakondala, Holly, MI (US)

(73) Assignee: Laird Technologies, Inc., Earth City, MO (US)

( * ) Notice: Subject to any disclaimer, the term of this patent is extended or adjusted under 35 U.S.C. 154(b) by 0 days.

(21) Appl. No.: 15/471,473

(22) Filed: Mar. 28, 2017

(65) Prior Publication Data

US 2017/0200329 A1    Jul. 13, 2017

Related U.S. Application Data

(63) Continuation-in-part of application No. PCT/US2015/052589, filed on Sep. 28, 2015, which
(Continued)

(51) Int. Cl.
*G07C 5/00* (2006.01)
*G01S 19/13* (2010.01)
*G07C 5/08* (2006.01)

(52) U.S. Cl.
CPC ............ *G07C 5/008* (2013.01); *G01S 19/13* (2013.01); *G07C 5/085* (2013.01); *G07C 5/0816* (2013.01)

(58) Field of Classification Search
CPC ...... G07C 5/008; G07C 5/085; G07C 5/0816; G01S 19/13
See application file for complete search history.

(56) References Cited

U.S. PATENT DOCUMENTS

| 5,381,128 A | 1/1995 | Kaplan |
| 5,612,578 A | 3/1997 | Drew |

(Continued)

FOREIGN PATENT DOCUMENTS

| CN | 101197022 A | 6/2008 |
| CN | 102693643 A | 9/2012 |

(Continued)

OTHER PUBLICATIONS

Corkery et al.; Miss a Payment? Good Luck Moving That Car; dated Sep. 24, 2014; The New York Times; 9 pages.

(Continued)

*Primary Examiner* — Mussa A Shaawat
*Assistant Examiner* — Michael V Kerrigan
(74) *Attorney, Agent, or Firm* — Harness, Dickey & Pierce, P.L.C.

(57) ABSTRACT

Exemplary embodiments are provided of telematics devices and exemplary corresponding methods. In an exemplary embodiment, a telematics device generally includes a controller, a wireless communication module to transmit ignition information to a remote station, a power input terminal to sense a voltage of the battery, and an ignition input terminal to couple to an ignition line of the vehicle. The controller determines whether the ignition input terminal is coupled to an ignition line of the vehicle, and when the terminal is coupled to an ignition line, the controller determines vehicle ignition turn on and ignition turn off events by detecting voltage changes on the ignition line. When the ignition input terminal is not coupled to an ignition line of the vehicle, the controller senses the voltage of the battery of the vehicle to determine vehicle ignition turn on and turn off events based on sensed voltage changes of the battery.

20 Claims, 11 Drawing Sheets

Related U.S. Application Data is a continuation-in-part of application No. PCT/US2015/052585, filed on Sep. 28, 2015.

(60) Provisional application No. 62/057,106, filed on Sep. 29, 2014, provisional application No. 62/057,125, filed on Sep. 29, 2014, provisional application No. 62/057,106, filed on Sep. 29, 2014, provisional application No. 62/057,125, filed on Sep. 29, 2014.

(56) References Cited

U.S. PATENT DOCUMENTS

| | | |
|---|---|---|
| 5,619,412 A | 4/1997 | Hapka |
| 5,722,378 A | 3/1998 | Sawazaki et al. |
| 5,802,545 A | 9/1998 | Coverdill |
| 5,841,026 A | 11/1998 | Kirk et al. |
| 5,969,595 A | 10/1999 | Schipper et al. |
| 6,195,648 B1 | 2/2001 | Simon et al. |
| 6,249,217 B1 | 6/2001 | Forbes |
| 6,424,157 B1 | 7/2002 | Gollomp et al. |
| 6,438,487 B1 | 8/2002 | Mingo et al. |
| 6,502,035 B2 | 12/2002 | Levine |
| 6,509,868 B2 | 1/2003 | Flick |
| 6,510,381 B2 | 1/2003 | Grounds et al. |
| 6,512,465 B2 | 1/2003 | Flick |
| 6,549,846 B1 | 4/2003 | Dance et al. |
| 6,609,064 B1 | 8/2003 | Dean |
| 6,611,755 B1 | 8/2003 | Coffee et al. |
| 6,664,888 B1 | 12/2003 | Bishop |
| 6,765,499 B2 | 7/2004 | Flick |
| 6,839,614 B1 | 1/2005 | Timko et al. |
| 6,871,067 B2 | 3/2005 | Clark et al. |
| 6,909,985 B2 | 6/2005 | Stana |
| 6,925,984 B2 | 8/2005 | Minato |
| 6,983,202 B2 | 1/2006 | Sanqunetti |
| 6,993,658 B1 | 1/2006 | Engberg et al. |
| 7,042,343 B2 | 5/2006 | Konno et al. |
| 7,078,828 B2 | 7/2006 | Suzuki |
| 7,088,219 B2 | 8/2006 | Dawson et al. |
| 7,091,629 B2 | 8/2006 | Hawkins |
| 7,119,696 B2 | 10/2006 | Borugian |
| 7,178,503 B1 | 2/2007 | Brehob |
| 7,184,866 B2 | 2/2007 | Squires et al. |
| 7,266,507 B2 | 9/2007 | Simon et al. |
| 7,323,970 B1 | 1/2008 | Murray et al. |
| 7,327,250 B2 | 2/2008 | Harvey |
| 7,366,589 B2 | 4/2008 | Habermas |
| 7,487,029 B2 | 2/2009 | Feeney et al. |
| 7,519,014 B2 | 4/2009 | Allen et al. |
| 7,538,655 B1 | 5/2009 | King |
| 7,571,036 B2 | 8/2009 | Olsen et al. |
| 7,652,576 B1 | 1/2010 | Crossno et al. |
| 7,667,580 B2 | 2/2010 | Tauchi et al. |
| 7,701,363 B1 | 4/2010 | Zlojutro |
| 7,706,963 B2 | 4/2010 | Parikh et al. |
| 7,720,486 B2 | 5/2010 | Ross et al. |
| 7,725,246 B2 | 5/2010 | Abendroth et al. |
| 7,761,232 B2 | 7/2010 | Woodings |
| 7,768,377 B2 | 8/2010 | Brey |
| 7,810,469 B2 | 10/2010 | Vigild et al. |
| 7,823,561 B2 | 11/2010 | Omuro et al. |
| 7,826,944 B2 | 11/2010 | Oesterling et al. |
| 7,848,765 B2 | 12/2010 | Phillips et al. |
| 7,860,628 B2 | 12/2010 | Lange |
| 7,881,710 B2 | 2/2011 | Keohane et al. |
| 7,917,253 B2 | 3/2011 | Inbarajan et al. |
| 7,940,173 B2 | 5/2011 | Koen |
| 7,962,260 B2 | 6/2011 | DiCroce et al. |
| 8,019,532 B2 | 9/2011 | Sheha et al. |
| 8,032,273 B2 | 10/2011 | Yang et al. |
| 8,050,811 B2 | 11/2011 | Inbarajan et al. |
| 8,102,247 B2 | 1/2012 | Arakawa |
| 8,112,185 B2 | 2/2012 | Wu |
| 8,217,772 B2 | 7/2012 | Morgan et al. |
| 8,253,549 B2 | 8/2012 | Murray et al. |
| 8,269,618 B2 | 9/2012 | Murray et al. |
| 8,280,616 B2 | 10/2012 | Barta |
| 8,306,560 B2 | 11/2012 | Krause et al. |
| 8,341,617 B2 | 12/2012 | Bunn |
| 8,346,420 B2 | 1/2013 | Tarnowsky et al. |
| 8,393,201 B2 | 3/2013 | Jaffe et al. |
| 8,437,935 B2 | 5/2013 | Braunberger et al. |
| 8,452,274 B2 | 5/2013 | Przybylski |
| 8,452,491 B2 | 5/2013 | Miyauchi et al. |
| 8,462,021 B2 | 6/2013 | Welch et al. |
| 8,471,701 B2 | 6/2013 | Yariv et al. |
| 8,473,149 B2 | 6/2013 | Cox |
| 8,482,612 B2 | 7/2013 | Tamir et al. |
| 8,489,271 B2 | 7/2013 | Hergesheimer et al. |
| 8,498,774 B2 | 7/2013 | Schurov |
| 8,510,200 B2 | 8/2013 | Pearlman et al. |
| 8,514,058 B2 | 8/2013 | Cameron |
| 8,559,910 B2 | 10/2013 | Yi et al. |
| 8,587,420 B2 | 11/2013 | Koen |
| 8,588,041 B1 | 11/2013 | Schillinger, Jr. |
| 8,612,137 B2 | 12/2013 | Harris et al. |
| 8,618,923 B2 | 12/2013 | Nakamura |
| 8,620,360 B2 | 12/2013 | Madhavan et al. |
| 8,620,518 B2 | 12/2013 | Bradley et al. |
| 8,649,952 B2 | 2/2014 | Nedorezov et al. |
| 8,655,541 B2 | 2/2014 | You |
| 8,682,525 B1 * | 3/2014 | Kalinadhabhotla .... G07C 5/008 340/442 |
| 8,686,841 B2 | 4/2014 | Macheca et al. |
| 8,700,299 B2 | 4/2014 | Morita et al. |
| 8,706,348 B2 | 4/2014 | Beams et al. |
| 8,723,687 B2 | 5/2014 | Thomas |
| 8,725,344 B2 | 5/2014 | Hamrick et al. |
| 8,727,056 B2 | 5/2014 | Nagda |
| 8,738,214 B2 | 5/2014 | Olsen et al. |
| 8,744,745 B2 | 6/2014 | Pudar et al. |
| 8,751,104 B2 | 6/2014 | Hermann et al. |
| 8,768,537 B2 | 7/2014 | Kim et al. |
| 8,779,912 B2 | 7/2014 | Sverrisson et al. |
| 8,779,947 B2 | 7/2014 | Tengler et al. |
| 8,781,708 B2 | 7/2014 | Wurts et al. |
| 8,787,949 B2 | 7/2014 | Sumcad et al. |
| 8,805,639 B1 | 8/2014 | Musicant et al. |
| 8,825,224 B2 | 9/2014 | Fazi |
| 8,841,999 B2 | 9/2014 | Ali et al. |
| 8,896,464 B2 | 11/2014 | Khachaturian |
| 2002/0008645 A1 | 1/2002 | Flick et al. |
| 2004/0239488 A1 | 12/2004 | Douglass et al. |
| 2007/0001830 A1 | 1/2007 | Dagci et al. |
| 2007/0194881 A1 | 8/2007 | Schwarz et al. |
| 2007/0233342 A1 | 10/2007 | DiCroce et al. |
| 2008/0021637 A1 | 1/2008 | Staton et al. |
| 2008/0221743 A1 | 9/2008 | Schwarz et al. |
| 2008/0255722 A1 | 10/2008 | McClellan et al. |
| 2008/0258890 A1 | 10/2008 | Follmer et al. |
| 2010/0023198 A1 | 1/2010 | Hamilton |
| 2010/0121522 A1 | 5/2010 | Wolfson et al. |
| 2010/0179897 A1 * | 7/2010 | Gafford ............... G06Q 10/087 705/35 |
| 2010/0274432 A1 | 10/2010 | Dlugoss et al. |
| 2011/0019657 A1 | 1/2011 | Zaher |
| 2011/0106373 A1 | 5/2011 | Hergesheimer et al. |
| 2012/0322463 A1 | 12/2012 | Moeller |
| 2013/0002481 A1 | 1/2013 | Solomon |
| 2013/0088371 A1 | 4/2013 | Welch et al. |
| 2013/0099977 A1 | 4/2013 | Sheshadri et al. |
| 2013/0106594 A1 | 5/2013 | Hiramatsu et al. |
| 2013/0117173 A1 | 5/2013 | Schwarz et al. |
| 2013/0141249 A1 | 6/2013 | Pearlman et al. |
| 2013/0144770 A1 | 6/2013 | Boling et al. |
| 2013/0144805 A1 | 6/2013 | Boling et al. |
| 2013/0211694 A1 | 8/2013 | Taglialatela et al. |
| 2013/0212214 A1 | 8/2013 | Lawson et al. |
| 2013/0337801 A1 | 12/2013 | Yi et al. |
| 2014/0006555 A1 | 1/2014 | Shields |
| 2014/0012483 A1 | 1/2014 | Huang et al. |
| 2014/0055529 A1 | 2/2014 | Matsunaga |
| 2014/0074353 A1 | 3/2014 | Lee et al. |
| 2014/0074692 A1 | 3/2014 | Beerle et al. |

(56) References Cited

U.S. PATENT DOCUMENTS

| | | |
|---|---|---|
| 2014/0111354 A1 | 4/2014 | Hergesheimer et al. |
| 2014/0118169 A1 | 5/2014 | Hamberger et al. |
| 2014/0160288 A1 | 6/2014 | Makaveev et al. |
| 2014/0172190 A1 | 6/2014 | Kalinadhabhotla et al. |
| 2014/0189641 A1 | 7/2014 | Anderson et al. |
| 2014/0210618 A1 | 7/2014 | Poe et al. |
| 2014/0236444 A1 | 8/2014 | Stefan et al. |
| 2014/0248918 A1 | 9/2014 | Yarnold et al. |
| 2014/0266635 A1 | 9/2014 | Roth et al. |
| 2014/0266652 A1 | 9/2014 | Morgan et al. |
| 2014/0266653 A1 | 9/2014 | Morgan et al. |
| 2014/0279293 A1 | 9/2014 | Morgan et al. |
| 2014/0279297 A1 | 9/2014 | Morgan et al. |
| 2014/0279381 A1 | 9/2014 | Morgan et al. |
| 2014/0279449 A1 | 9/2014 | Ginder et al. |

FOREIGN PATENT DOCUMENTS

| | | |
|---|---|---|
| CN | 102797456 A | 11/2012 |
| CN | 103154694 A | 6/2013 |
| CN | 103179175 A | 6/2013 |
| CN | 203637765 U | 6/2014 |
| EP | 2777995 A1 | 9/2014 |
| KR | 10-2006-0032824 | 4/2006 |
| WO | WO-2013138798 A1 | 9/2013 |

OTHER PUBLICATIONS

Non-final Office Action for U.S. Appl. No. 15/471,561, filed Mar. 28, 2017 which is claims priority to the same parent application as the instant application, dated Jul. 17, 2017, 24 pages.s.

* cited by examiner

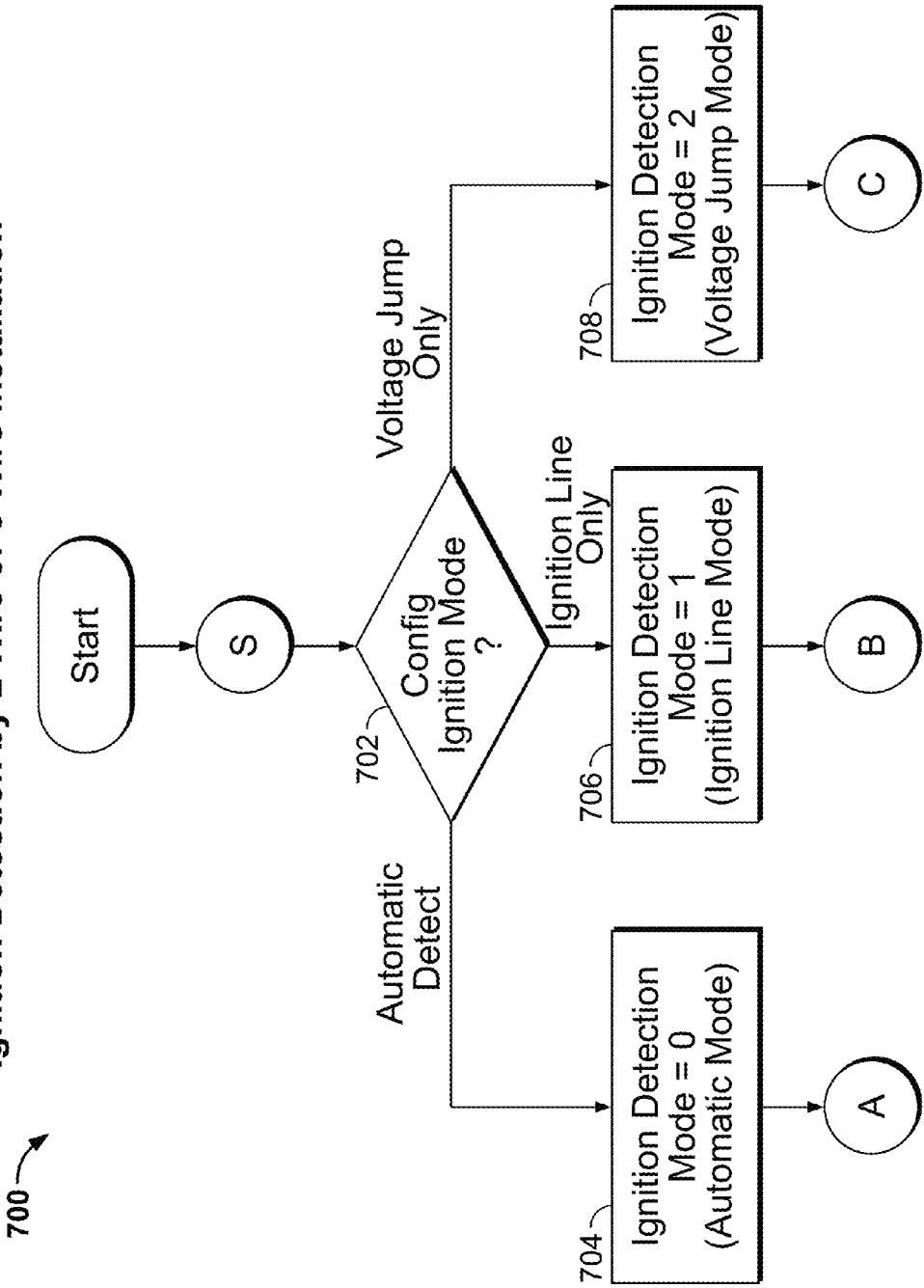

TELEMATICS DEVICES AND METHODS FOR VEHICLE IGNITION DETECTION

CROSS-REFERENCE TO RELATED APPLICATIONS

This application is a continuation-in-part of International Application No. PCT/US2015/052589 filed Sep. 28, 2015 (published as WO 2016/053841 on Apr. 7, 2016), which, in turn, claims the benefit of U.S. Provisional Application No. 62/057,106 filed on Sep. 29, 2014, and U.S. Provisional Application No. 62/057,125 filed on Sep. 29, 2014.

This application is a continuation-in-part of International Application No. PCT/US2015/052585 filed Sep. 28, 2015 (published as WO 2016/053839 on Apr. 7, 2016), which, in turn, claims the benefit of U.S. Provisional Application No. 62/057,106 filed on Sep. 29, 2014, and U.S. Provisional Application No. 62/057,125 filed on Sep. 29, 2014. The entire disclosures of the above applications are incorporated herein by reference.

The entire disclosures of the above applications are incorporated herein by reference.

FIELD

The present disclosure generally relates to devices and methods for vehicle ignition detection.

BACKGROUND

This section provides background information related to the present disclosure which is not necessarily prior art.

Telematics devices (e.g., vehicle tracker devices, etc.) may be coupled to vehicles to track location and other features of the vehicle. The vehicle tracker devices may include communication with a remote station. These devices may allow users to monitor vehicles that are being rented, leased, are subject to a loan, etc. Vehicles may include ignitions for turning on the vehicle and turning off the vehicle.

SUMMARY

This section provides a general summary of the disclosure, and is not a comprehensive disclosure of its full scope or all of its features.

According to various aspects, exemplary embodiments are provided of telematics devices and exemplary corresponding methods. In an exemplary embodiment, a telematics device generally includes a controller and a wireless communication module coupled to the controller. The wireless communication module is configured to transmit ignition information from the controller to a remote station. The device also includes a power input terminal configured to couple to a battery of a vehicle to sense a voltage of the battery, and an ignition input terminal configured to couple to an ignition line of the vehicle. The controller is configured to determine whether the ignition input terminal is coupled to an ignition line of the vehicle. When the ignition input terminal is coupled to an ignition line of the vehicle, the controller is configured to determine vehicle ignition turn on and ignition turn off events by detecting voltage changes on the ignition line. When the ignition input terminal is not coupled to an ignition line of the vehicle, the controller is configured to sense the voltage of the battery of the vehicle to determine vehicle ignition turn on and turn off events based on sensed voltage changes of the battery.

According to additional aspects of the present disclosure, an exemplary method of detecting ignition events of a vehicle using a telematics device is disclosed. The telematics device includes a controller, a wireless communication module, a power input terminal configured to couple to a battery of a vehicle to sense a voltage of the battery, and an ignition input terminal configured to couple to an ignition line of the vehicle. The method includes determining whether the ignition input terminal is coupled to an ignition line of the vehicle. When the ignition input terminal is coupled to an ignition line of the vehicle, the method includes determining ignition turn on and ignition turn off events by detecting voltage changes on the ignition line. When the ignition input terminal is not coupled to an ignition line of the vehicle, the method includes sensing a voltage of a battery of the vehicle to determine ignition turn on and turn off events based on voltage changes of the battery.

According to additional aspects of the present disclosure, an exemplary telematics device includes a controller and a location sensor coupled to the controller. The location sensor is configured to determine a location of the telematics device and a speed of the telematics device. The device also includes a motion detector coupled to the controller and configured to determine acceleration of the telematics device, and a wireless communication module coupled to the controller. The wireless communication module is configured to transmit ignition information from the controller to a remote station. The device further includes a power input terminal configured to couple to a battery of a vehicle to sense a voltage of the battery. The controller is configured to determine that a vehicle ignition turn off event has occurred when at least one of the following conditions is satisfied: the sensed voltage of the battery decreases by at least a specified voltage decrease threshold and the sensed speed of the telematics device is less than a speed decrease threshold for at least a speed decrease duration; and the sensed acceleration of the telematics device is less than an acceleration threshold for at least an acceleration decrease duration and the sensed speed of the telematics device is less than the speed decrease threshold for at least the speed decrease duration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a line graph on an example battery voltage during vehicle ignition turn on;

FIG. 7 is a line graph of an example measured battery voltage during vehicle ignition turn on;

FIGS. 9A-9D are flowcharts of an example method of detecting vehicle ignition according to another example embodiment.

DETAILED DESCRIPTION

Example embodiments will now be described more fully with reference to the accompanying drawings.

Disclosed are examples of telematics devices (e.g., low-end telematics devices, etc.) for aftermarket applications (e.g., installed in a vehicle after final manufacturing assembly of the vehicle, etc.). An example device may communicate to one or more servers (e.g., a back end server, etc.) via one or more wireless networks (e.g., a cell network, an SMS gateway, etc.). The device may track vehicle location (e.g., a vehicle tracker device having a global positioning satellite (GPS) receiver, etc.). The device may also monitor vehicle sensor data. In some embodiments, the device does not include a controller area network (CAN) interface. The device may selectively disable the vehicle if commanded from the server.

Figure 1:
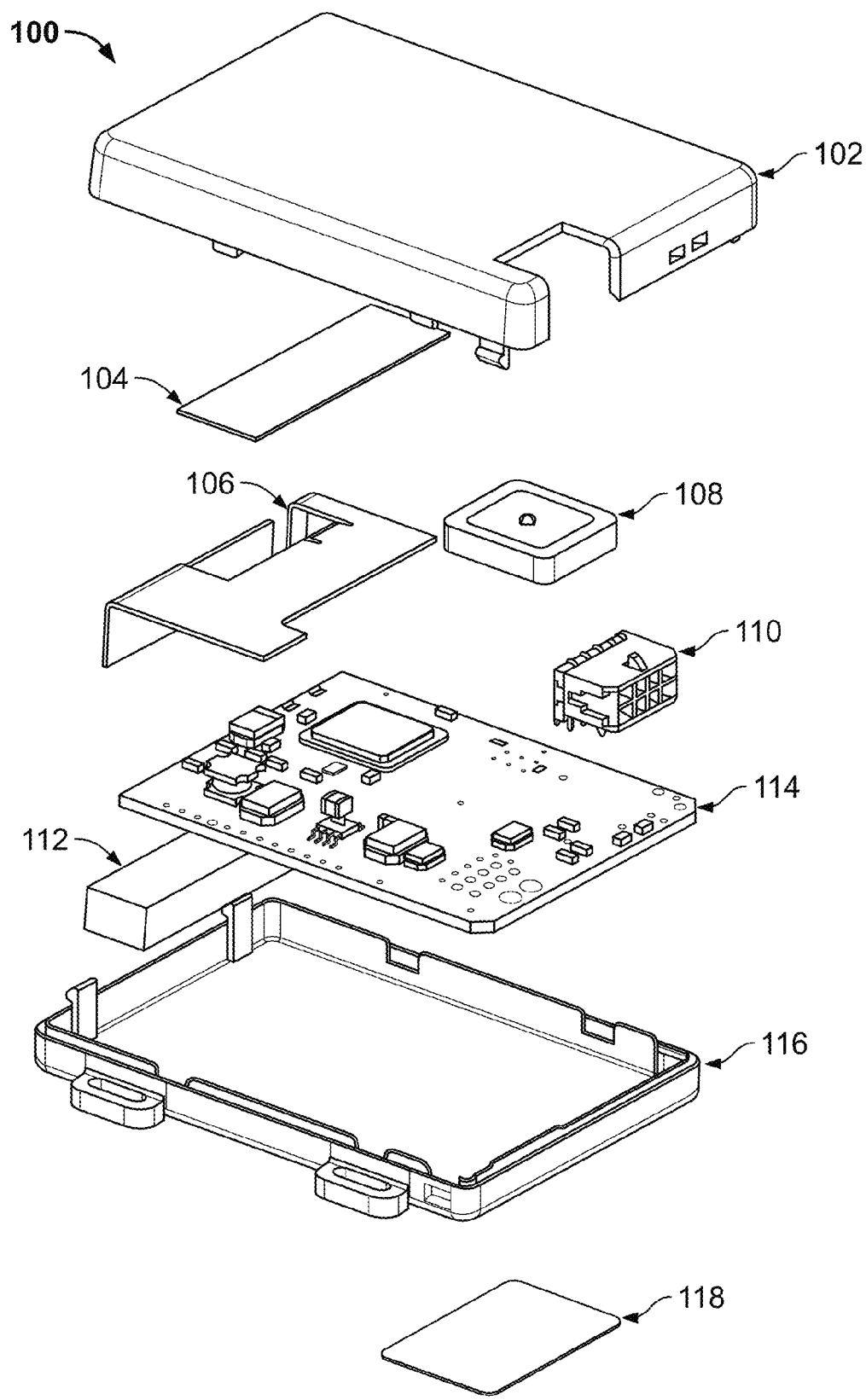
FIG. 1 is an exploded perspective view of a telematics device according to an exemplary embodiment.
Figure 2:
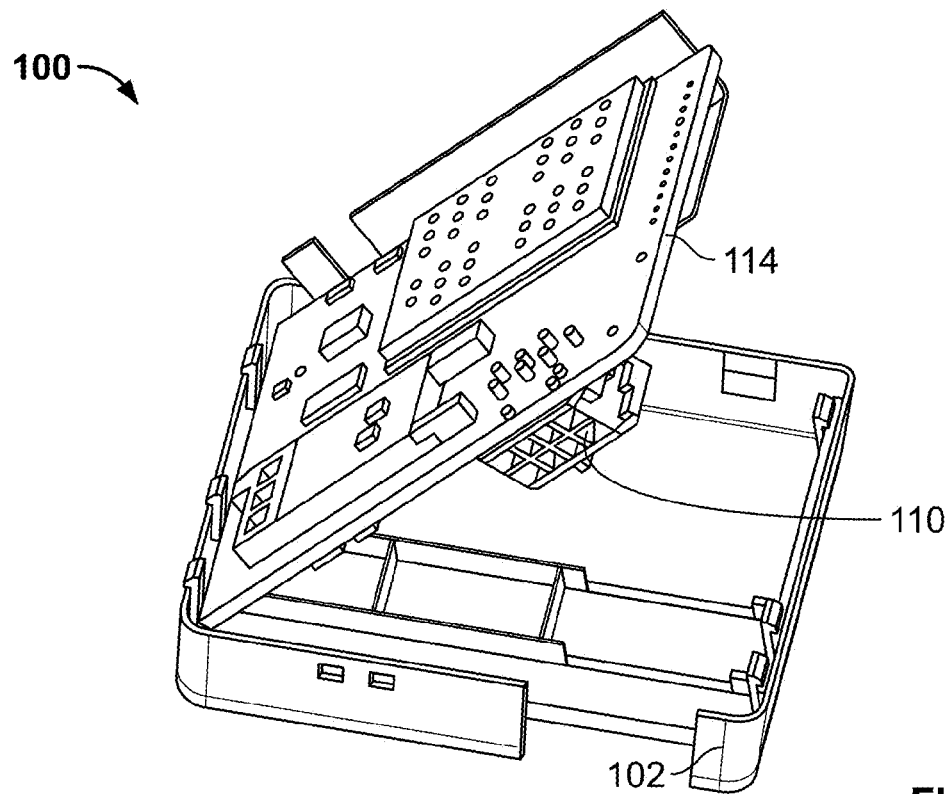
FIG. 2 is another perspective view of the telematics device shown in FIG. 1 showing partial assembly.
Figure 3:
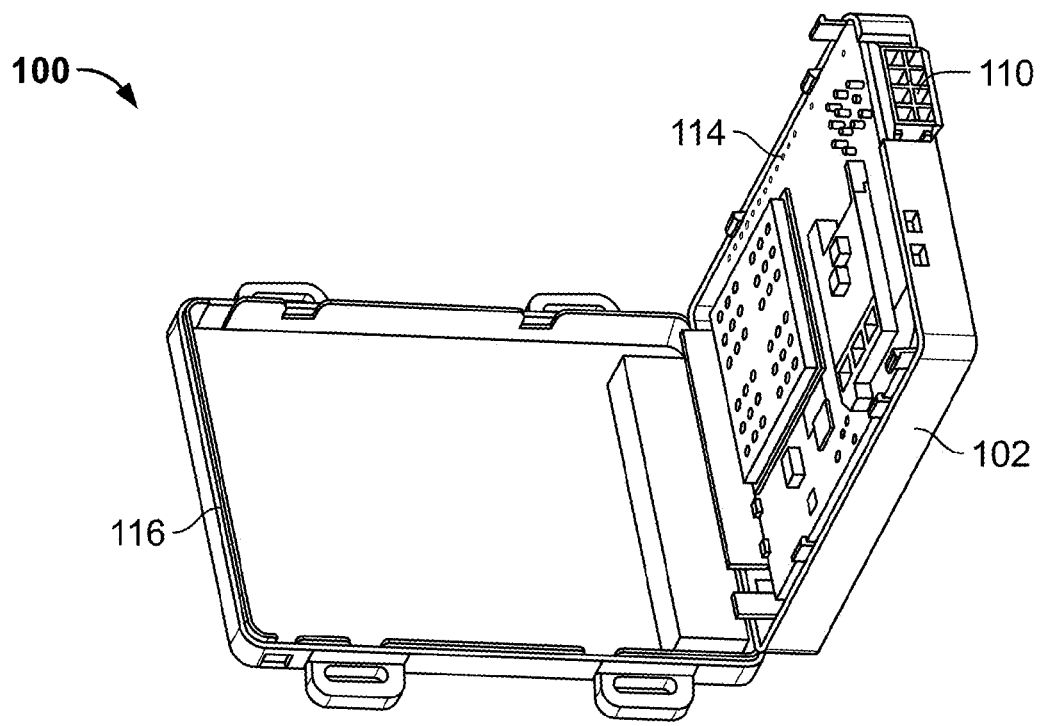
FIG. 3 is another perspective view of the telematics device shown in FIG. 1 showing further assembly.

FIGS. 1-3 illustrate an exemplary embodiment of a vehicle tracker device 100. As shown in FIG. 1, the device 100 includes a cover 102. The cover 102 may be any suitable cover capable of protecting device components while allowing wireless signals to be sent from and/or received by the device 100.

The device 100 also includes an adhesive patch 104 and a cellular antenna element 106 (broadly, a wireless communication module). The cellular antenna element 106 may be any element suitable for sending and/or receiving cellular network signals (e.g., CDMA, GSM, 2G, 3G, 4G, LTE, etc.). The cellular antenna element 106 may transmit location information, event information, etc. to a remote station.

The device 100 includes a global positioning satellite (GPS) patch antenna 108. The GPS patch 108 may be configured to detect GPS signals for determining a location of the device 100, and therefore the vehicle to which the device 100 is coupled. In some embodiments, the GPS patch 108 may be combined with the adhesive patch 104, may be part of the adhesive patch 104, etc. Some embodiments may not include an adhesive patch 104.

The device 100 includes a connector 110. The connector 110 may include any suitable connections for powering the device 100 (e.g., via vehicle battery, alternator, other power source, etc.), reading vehicle sensors (e.g., an ignition line, etc.), other suitable connectors, connection to the vehicle starter to enable/disable the starter, etc.

In some embodiments, the telematics device may include a connector 110 may be coupled to a vehicle interface connection (e.g., a vehicle bus, a controller area network (CAN) bus of the vehicle, an on-board diagnostics (OBD) connector of the vehicle, etc.). Accordingly, the telematics device may obtain vehicle parameters (e.g., speed, etc.) from the vehicle interface connection.

A printed circuit board assembly (PCBA) 114 may include any suitable device components. In this illustrated embodiments, the PCBA 114 may include the adhesive patch 104, cellular element 106, GPS patch 108, connector 110, etc.

The device 100 may also include a foam pad 112. The foam pad 112 may provide support for one or more device components (e.g., PCBA 114, etc.) within the housing 116. The foam pad 112 may be positioned to help hold one or more device components in place and/or inhibit vibrations during travel of the vehicle to which the device 100 is mounted.

The housing 116 may be coupled to the cover 102 such that the housing 116 and cover 102 cooperatively define an interior for housing the various device components, e.g., PCBA 114, adhesive patch 104, cellular element 106, GPS patch 108, connector 110, etc.

The housing 116 and cover 102 may be made out of the same or similar dielectric material, e.g., plastic, etc. A label 118 may be adhesively attached to an outer surface of the housing 116. The label 118 may include information for identifying the particular device 100.

The device 100 may also include an accelerometer or other component for detecting motion, a port (e.g., serial port, etc.) for programming the device 100, a controller (e.g., a 16 bit microcontroller with flash memory, etc.), a relay driver to enable and/or disable a vehicle starter, a power supply (e.g., a 12V to 3.35V DC to DC power supply, an RF front end, one or more analog inputs, a SIM card for GSM, etc.), etc.

As shown in FIG. 2, the PCBA 114 may snap into the cover 102. As shown in FIG. 3, the cover 102 and PCBA 114 may then snap into the housing 116. In other embodiments, the PCBA 114 may be coupled to the cover 102 and housing 116 using other suitable techniques, including friction fits, fasteners, etc.

Figure 4:
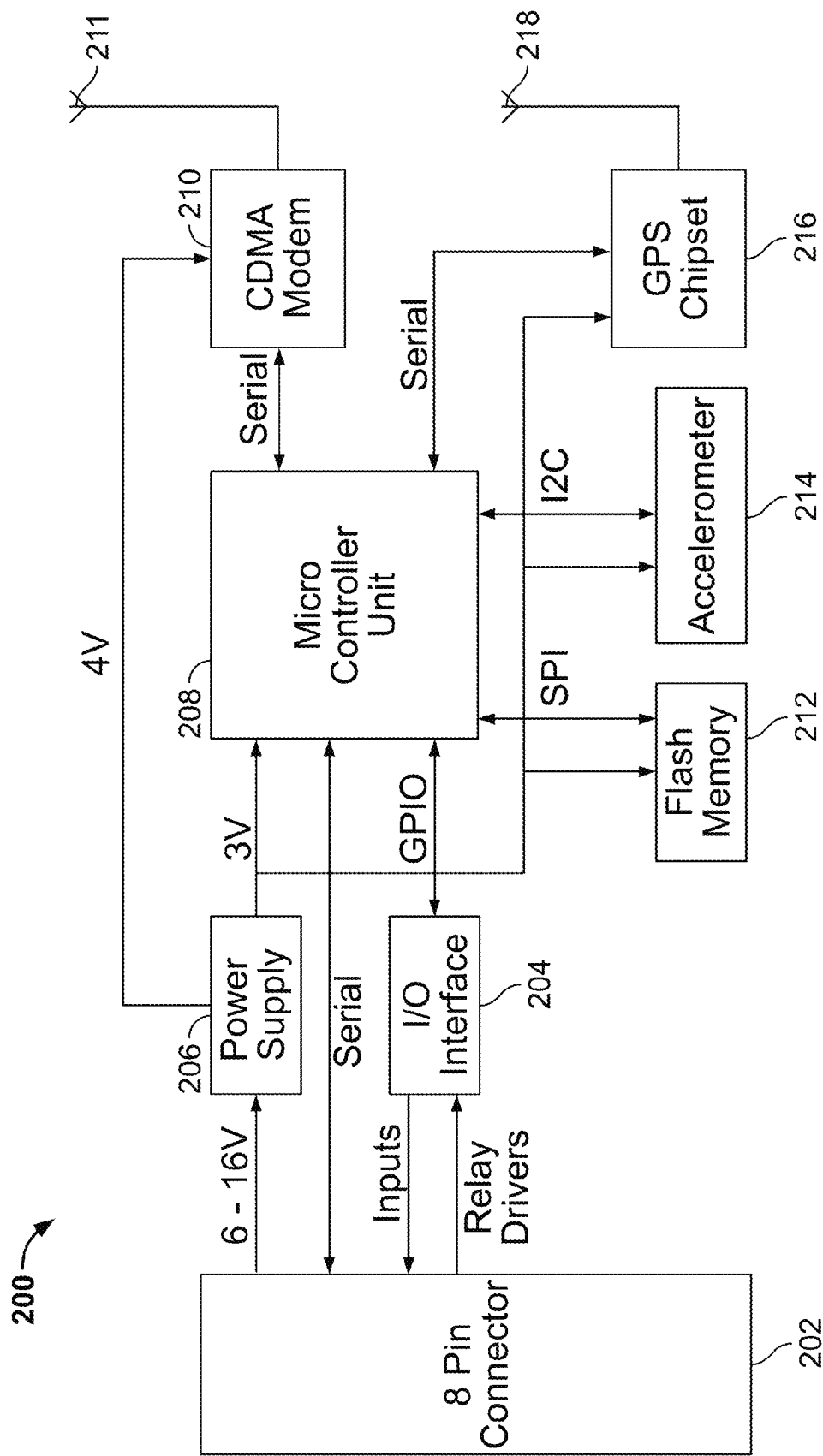
FIG. 4 is a block diagram of an exemplary system architecture of the telematics device of FIG. 1 according to another exemplary embodiment.

FIG. 4 illustrates an example system architecture 200 of the device 100. The system architecture 200 includes an 8-pin connector 202. In other embodiments, more and/or other types of connectors may be used. The architecture 200 includes an input/output (I/O) interface 204 and a power supply 206. The power supply 206 converts an input voltage in the range of about 6 volts (V) to 16V into an output voltage of about 3V and 4V. In other embodiments, other voltages may be used.

Architecture 200 includes a micro controller unit 208 (broadly, a controller), which may be any suitable processor. The micro controller unit 208 is coupled to the power supply 206, which converts the input voltage in the range of about 6 volts (V) to 16V into an output voltage of about 3V for the micro controller unit 208. FIG. 4 also shows the micro controller unit 208 coupled to the I/O interface 204 via GPIO (General Purpose Input/Output).

Architecture 200 includes a flash memory 212, although other suitable memory may be used in other embodiments. In this example, FIG. 4 shows the flash memory 212 coupled to the micro controller unit 208 via SPI (Serial Peripheral Interface) bus. The flash memory 212 is also coupled to the power supply 206, which converts the input voltage in the range of about 6 volts (V) to 16V into an output voltage of about 3V for the flash memory 212.

Architecture 200 also includes a CDMA modem 210 for sending and/or receiving cellular signals via antenna 211. The CDMA modem 210 is coupled to the power supply 206, which converts the input voltage in the range of about 6 volts (V) to 16V into an output voltage of about 4V for the CDMA model 210. In this example, FIG. 4 shows the CDMA modem 210 coupled to the micro controller unit 208 via a serial connection. Other embodiments may include cellular elements configured to communicate on different cellular networks.

Accelerometer 214 is coupled to the micro controller unit 208 and may detect motion. The accelerometer 214 is also coupled to the power supply 206, which converts the input voltage in the range of about 6 volts (V) to 16V into an output voltage of about 3V for the accelerometer 214. In this example, FIG. 4 shows the accelerometer 214 coupled to the micro controller unit 208 via I2C (Inter-Integrated Circuit), which is a multi-master, multi-slave, single-ended, serial computer bus.

GPS chipset 216 is coupled to the micro controller unit 208 and may receive GPS signals via antenna 218 for determining a location of the GPS chipset 216, and therefore the vehicle tracker device. The GPS chipset 216 is also coupled to the power supply 206, which converts the input voltage in the range of about 6 volts (V) to 16V into an output voltage of about 3V for the GPS chipset 216. In this example, FIG. 4 shows the GPS chipset 216 coupled to the micro controller unit 208 via a serial connection.

Although specific communication protocols, connections, and voltage levels are shown in the labels of FIG. 4, it should be apparent that other embodiments may include other connection layouts, different communication protocols, different voltage levels, etc.

The exemplary telematics devices described herein may provide one or more advantageous features as further described below. Some exemplary embodiments may mirror customer data flow from the telematics devices, provide two-wire vehicle ignition detection, may include M2M (machine to machine), GPS, cellular communication, vehicle finance features, communication, event logging, over the air updates, detect parking events, detect geofences, detect vehicle idling, detect vehicle speeding, include a late payment mode, provide starter enable and/or disable, include customer data flow, include an accelerometer to detect motion, etc.

The following features may be implemented using any suitable techniques, including firmware, software stored in device memory, etc.

The device may send vehicle location and event reports to a remote monitoring station using a STEL communication protocol. Communication may be with a backend server via an IP message (UDP/TCP), an SMS (Short Message Service) text message, etc. These messages may only be accepted from approved addresses and/or phone numbers loaded into a configuration file. The device may expect an acknowledgement for every message it transmits to the server. If the acknowledgement is not received by the device, the device may resend the same message after a predefined timeout period until it successfully receives an acknowledgment from the server. The device may acknowledge every command it receives from the server.

When cellular network coverage is not available, the device may store reports and/or events internally. When the cellular network coverage is available again, the device may send the saved reports and/or events. The device may respond to a request for location with a location report. The device may allow the server to update and/or change configurations. The configurations may be stored in internal data flash with a unique algorithm. Configurations that are strings may be stored uniquely based on a string buffer technique.

The device may send a daily heartbeat location report, which may include latitude, longitude, date, time, device ID, etc. The heartbeat frequency can be configurable by customers among a choice of presets.

The device may send a parking alert event when the vehicle has been stationary for more than one hour, which may include the device location. This alert may be configurable among a choice of presets.

The device may support geofences, e.g., circular and/or polygon geofences, etc. The server administrator can add, modify, delete, etc. any geofence. The device may check for geofence events every period (e.g., second, etc.). The device may send a geofence alert every time the vehicle transitions from inside to outside of the geofence or vice versa.

When the ignition is OFF, the device may transit to low current draw/low power mode. The device may support over the air (OTA) updates of device firmware. The device may provide basic sanity checks on the new GPS location. If the GPS location is upset, the device may save the last good location. The device may provide location aging.

The device may detect idling events. When the ignition is on and the device is not moving for more than a few minutes, the device may detect this as vehicle idling and report this event. The device may provide speeding events. When the ignition is ON and the device is moving faster than a configured speeding exceed limit for more than a speeding exceed interval, the device may report a speeding exceed event.

The device may support ignition detection based on voltage changes on VBatt line and/or ignition detection on a dedicated ignition line input. The device may trigger a buzzer warning alert for a few seconds on an external connected buzzer every time an ignition ON is detected in a late payment mode (e.g., the vehicle owner is late making a payment on the vehicle, etc.). This late payment mode feature may be enabled or disabled from a remote server.

The device may support disabling of the vehicle engine starter (e.g., for recovery purposes, etc.) and may also provide the capability to override the disabled starter. The device may respond to a request to disable the vehicle by sending an acknowledgment to the request and sending the GPS position report at the time the request is received. Following the acknowledgement of the received disable request, the device may check that conditions for disable of the starter are present. These conditions may include the ignition is OFF, the vehicle is stationary, cellular coverage exists, there is a valid GPS fix, etc. When these conditions are present, the device may send a GPS location report and disable the engine starter.

In some embodiments, the disabled starter may be enabled by toggling the ignition key ON/OFF for a predefined period. For example, the device may support a manual override of the starter disable. Manual starter override (MSO) may require the driver to follow a unique sequence of ON and OFF patterns on the Ignition Key. The MSO may be active for 24 hours.

As an example, if a vehicle starter has been disabled, the driver, vehicle purchaser, etc. may need to use the vehicle to travel to make a payment (e.g., pay on the car loan to have the starter re-enabled and avoid default, repossession, etc.), travel for an emergency (e.g., go to a hospital for a medical emergency, leave an unsafe area, avoid being stranded in a cold weather environment, etc.).

The driver may call the device provider (e.g., customer, vehicle finance/loan originator, etc.) requesting an override of the starter disable. The device provider may then provide manual starter override sequence to the driver.

The sequence may include an ignition pattern having a series of ignition turn ON and turn OFF events. For example, the sequence may require the driver to insert the key into the vehicle ignition, use the key fob, etc. to turn the ignition ON and OFF in a particular pattern.

An example pattern may include a fixed number of turn ON and turn OFF cycles greater than or equal to a pattern threshold. For example, the driver may be required to turn ON and OFF five times within a threshold period of time. Each single turn ON and turn OFF may be required to be completed within a single cycle time period threshold (e.g., between about 100 milliseconds and about 2 seconds, etc.), and each total amount of turn ON and turn OFFs may be required to be completed within a total cycle time limit (e.g., all five turn ON and turn OFF events must be completed within about twenty seconds, etc.).

Once the pattern is completed, the disable may be overridden for a temporary override period (e.g., about 24 hours, two days, four days, etc.) such that the driver can use the car and start the car during the override period. Once the override period is over, the starter may be automatically disabled again.

The first time a driver calls for an override code may be considered as a first override period (e.g., a first chance to pay the bill to avoid default, etc.). If the driver does not pay during this period and the starter is disabled again, the driver may request a second override, by calling the device operator. The device operator may provide a different (or same) second sequence (e.g., 7 turn ON and turn OFF cycles, etc.) to allow the driver to override the starter disable again for a second temporary period (e.g., another 24 hours, etc.).

The driver may be limited to a specified number of overrides (e.g., two overrides, three overrides, etc.). Accordingly, the last override may be considered a final chance such that the driver cannot get any further overrides and the car may be repossessed unless the driver makes further payments. Alternatively, the device provider may continue to provide additional starter override sequences that are the same or different from the initial code sequences.

Although the example is described as a first override with a 5 turn ON-OFF sequence and a second override with a 7 turn ON-OFF sequence, other embodiments may include more or less overrides, more or less turn ON and turn OFF events during each sequence, other time limits on entering the sequences (e.g., more or less than between 100 milliseconds and 2 seconds for a single cycle, more or less than 20 seconds for a total cycle, etc.), different ignition sequences, different temporary override periods (e.g., more or less than 24 hours, etc.), etc.

In some embodiments, the override sequence may be stored (e.g., loaded in memory, etc.) in the device before and/or at the time the device is attached to the vehicle. Thus, the override sequence may not be sent to the device periodically, but instead may always be present such that a driver can enter the sequence at any time after the starter is remotely disabled by the device provider by calling the device provider and obtaining the sequence instruction. In some embodiments, the override sequences may be the same across multiple devices installed on different cars. Alternatively, different devices may have different pre-loaded override sequences, and device providers may be able to change/update the sequences periodically.

The starter disable may be overridden by an emergency enable command (e.g., an "EMERGENCYA" command, etc.), which may override the starter disable for about 24 hours, etc.

The device may detect and report if the vehicle is being towed as when conditions are met, including vehicle motion is detected via an accelerometer, vehicle theft/towing detection may be enabled when the ignition is OFF, a towing event may be generated if there is a change in position greater than a predefined limit during ignition OFF, etc.

External sensors may be connected to digital inputs, which may be periodically monitored and can report a change status to the server. External sensors connected on analog inputs may be periodically monitored and can be reported at a predefined periodicity or for a change that is greater than a preconfigured value threshold. For example, the preconfigured value threshold may be a change of 1% of maximum monitored sensor value. Digital outputs may be controlled by the server.

The device may have the ability to send a duplicate data flow to a second server. The second server may be controlled by another party, entity, company, etc. The second data flow may not incorporate all of the reliability features of the primary data flow.

The device may send a signal when the vehicle battery drops below a specific threshold. The accelerometer may be able to detect motion during ignition on and off states. The device may detect hard acceleration and sizeable g force (e.g., to detect vehicle collisions, etc.).

The device may support one or more counters, including an odometer for tracking cumulative distance travelled by the vehicle, an hours on counter for tracking cumulative time ignition has been on, a speeding counter for tracking cumulative time above a threshold speed, a high acceleration events counter for tracking acceleration above a threshold, etc.

The device may have one or more LED's (e.g., a blue LED to indicate cellular signal, a green LED to indicate GPS signal, etc.). The LEDs may blink while searching, and may remain solid when the signal is confirmed. LEDs may be turned off after a preset time.

All events may be grouped based on event group ID's. And, any group events identified by a unique group ID can be enabled or disabled.

Telematics devices can be installed in a three wire installation where one wire of the telematics device is connected to a power line of a vehicle (e.g., a line coupled to a battery of the vehicle to sense a voltage of the battery, etc.), another wire of the telematics device is connected to a ground line of the vehicle, and another wire of the telematics device is connected to the ignition line of the vehicle. Alternatively, telematics devices can be installed in two wire installations, with one wire connected to a power line of the vehicle and another line connected to a ground of the vehicle (e.g., no wire is connected to the ignition line, etc.).

In three wire installations, detecting ignition turn on events and ignition turn off events may be implemented by sensing voltage transitions on the ignition line. In two wire installations there is no connection to the ignition line, so ignition turn on events and ignition turn off events cannot be detected via the ignition line.

A telematics device may sense a voltage at an ignition wire input of the telematics device to determine whether the telematics device is connected to the ignition line of a vehicle (e.g., a three wire installation, etc.). If a voltage is present at the ignition wire input of the vehicle (e.g., the voltage is above a threshold, etc.) the telematics device may determine that it is connected to the ignition line.

Two wire installations that do not include a connection to the ignition line may require a different technique to determine ignition turn on and turn off events. For example, a telematics device may sense a voltage on the power wire input to determine voltage changes of the battery.

Figure 5:
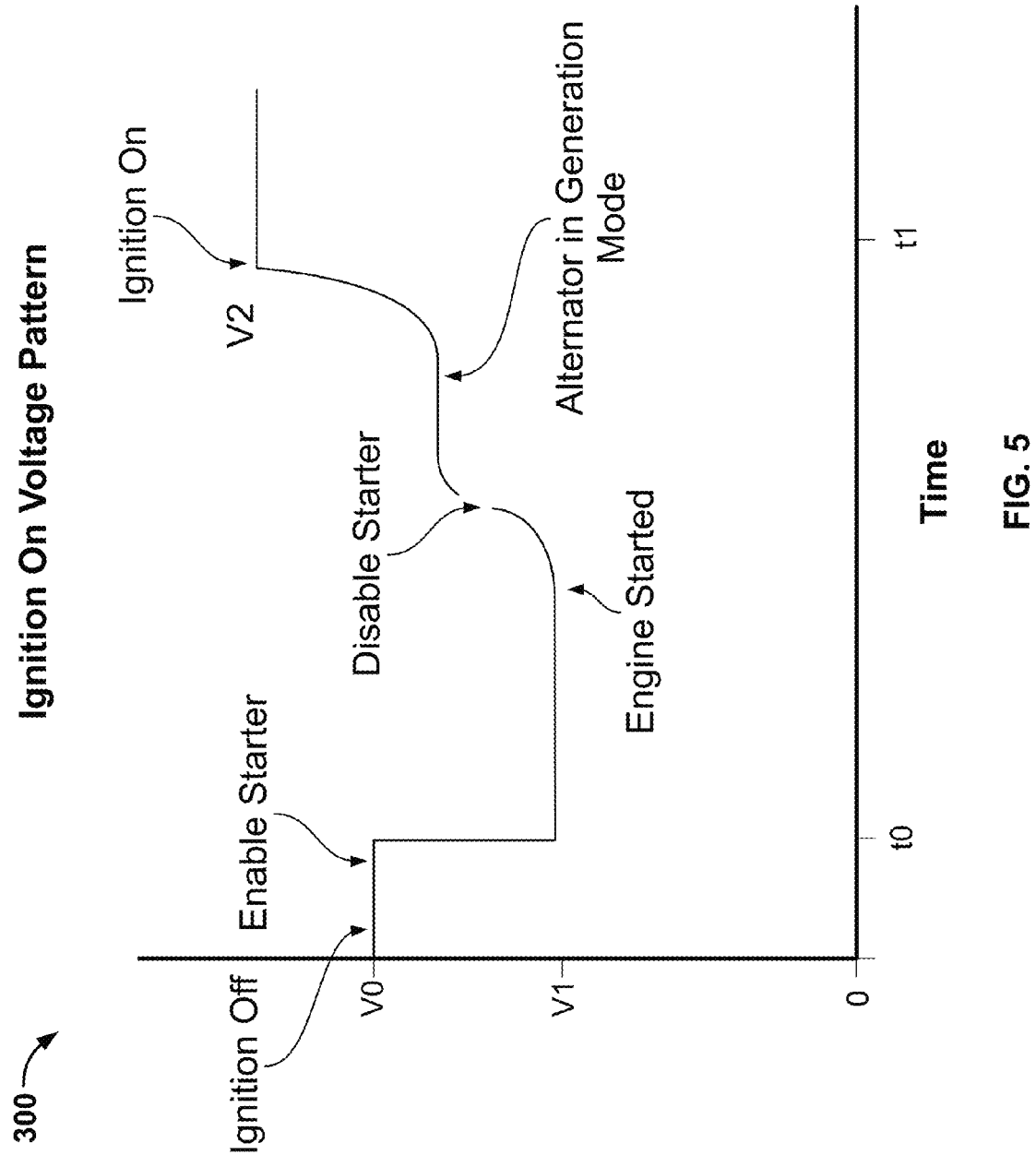

FIG. 5 illustrates an example voltage pattern 300 observed for a battery in a vehicle (e.g., a car, truck, automobile, etc.) during ignition turn on. When the ignition is initially off, the battery voltage is steady at V0. When the ignition is turned on (e.g., starter enabled, etc.) at time t0, the voltage drops to voltage V1 as the starter draws power from the battery. Once the engine starts and the starter is disabled, the battery voltage increases. As the alternator starts generating power and supplying the power to the battery, the battery voltage increases until it reaches voltage V2 at ignition turn on at time t1. As shown in FIG. 1, the battery voltage has a transient behavior between time t0 and t1. The battery voltage V2 after ignition turn on is higher than the battery voltage V0 when the ignition is off.

Figure 6:
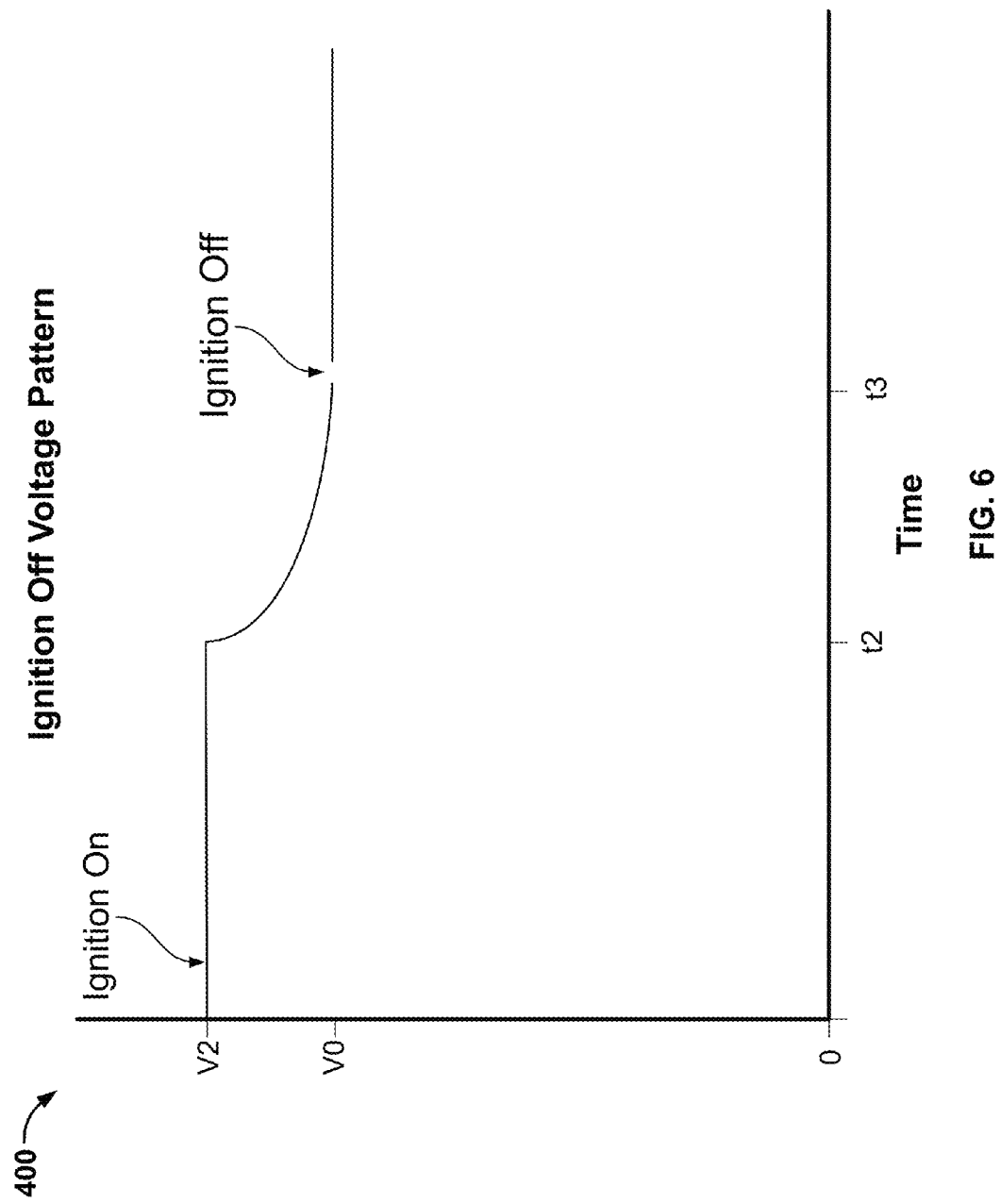
FIG. 6 is a line graph of an example battery voltage during vehicle ignition turn off.

FIG. 6 illustrates an example battery voltage pattern 400 when the ignition is turned off. Initially, the battery voltage is at V2 when the ignition is on. When the ignition is turned off starting at time t2, the battery voltage drops until it reaches voltage V0 at time t3.

Accordingly, during an ignition turn on event there may be an increase in the battery voltage, and during an ignition turn off event there may be a decrease in the battery voltage. If the battery voltage is observed from a stable state (e.g., while the ignition is off, etc.), an increase in the battery voltage may imply an ignition turn on event. Similarly, when the ignition is on, a decrease in the battery voltage may imply an ignition turn off event.

The amount of voltage increase or decrease during ignition turn on or turn off events may vary depending on the vehicle, the type of battery, etc. In some embodiments, the voltage may increase by about one volt during ignition turn on, and may decrease by about one volt during ignition turn off. In two wire installations, an algorithm may be used to determine ignition turn on and turn off events based on battery voltage increases or decreases.

Figure 7:
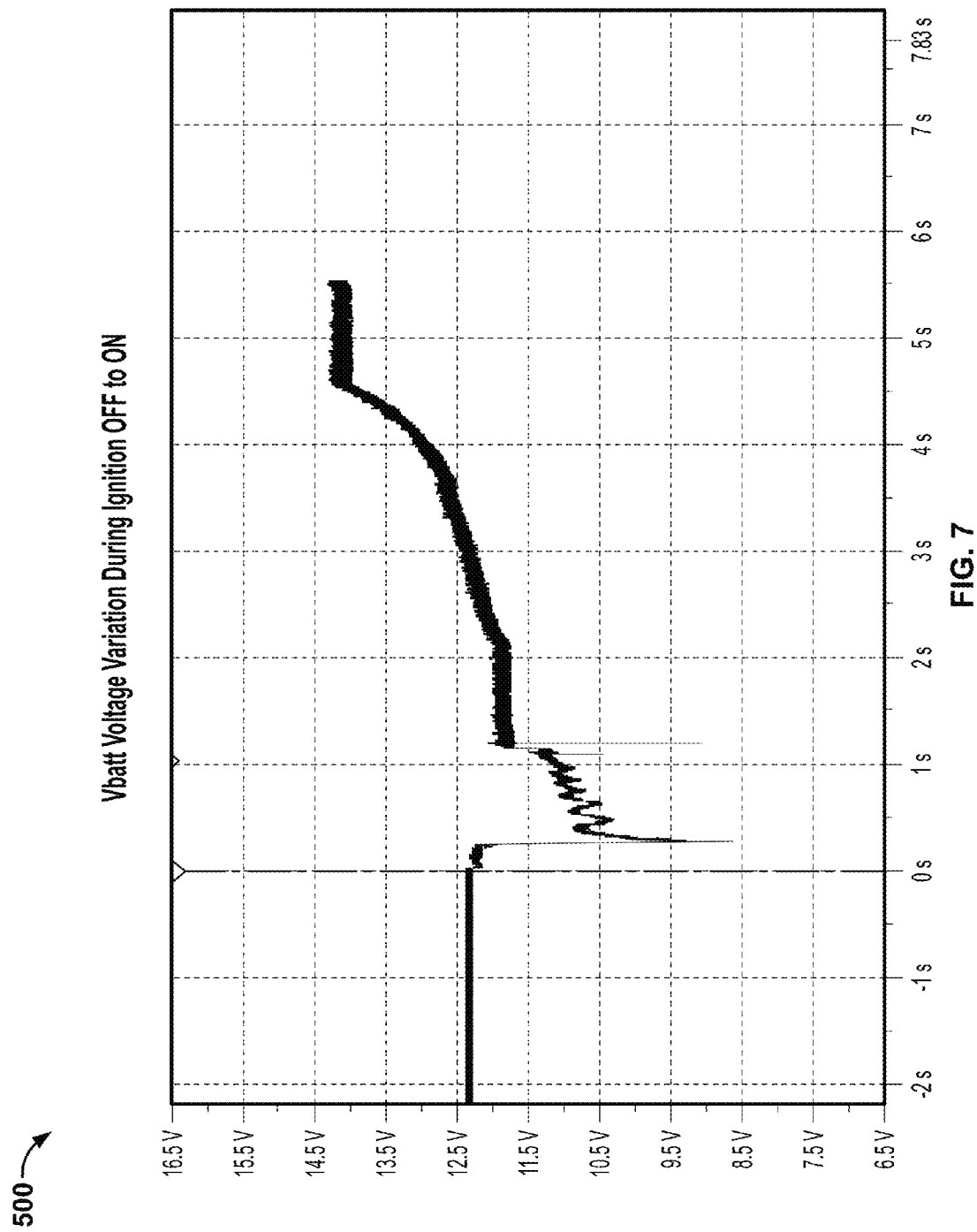
Figure 8:
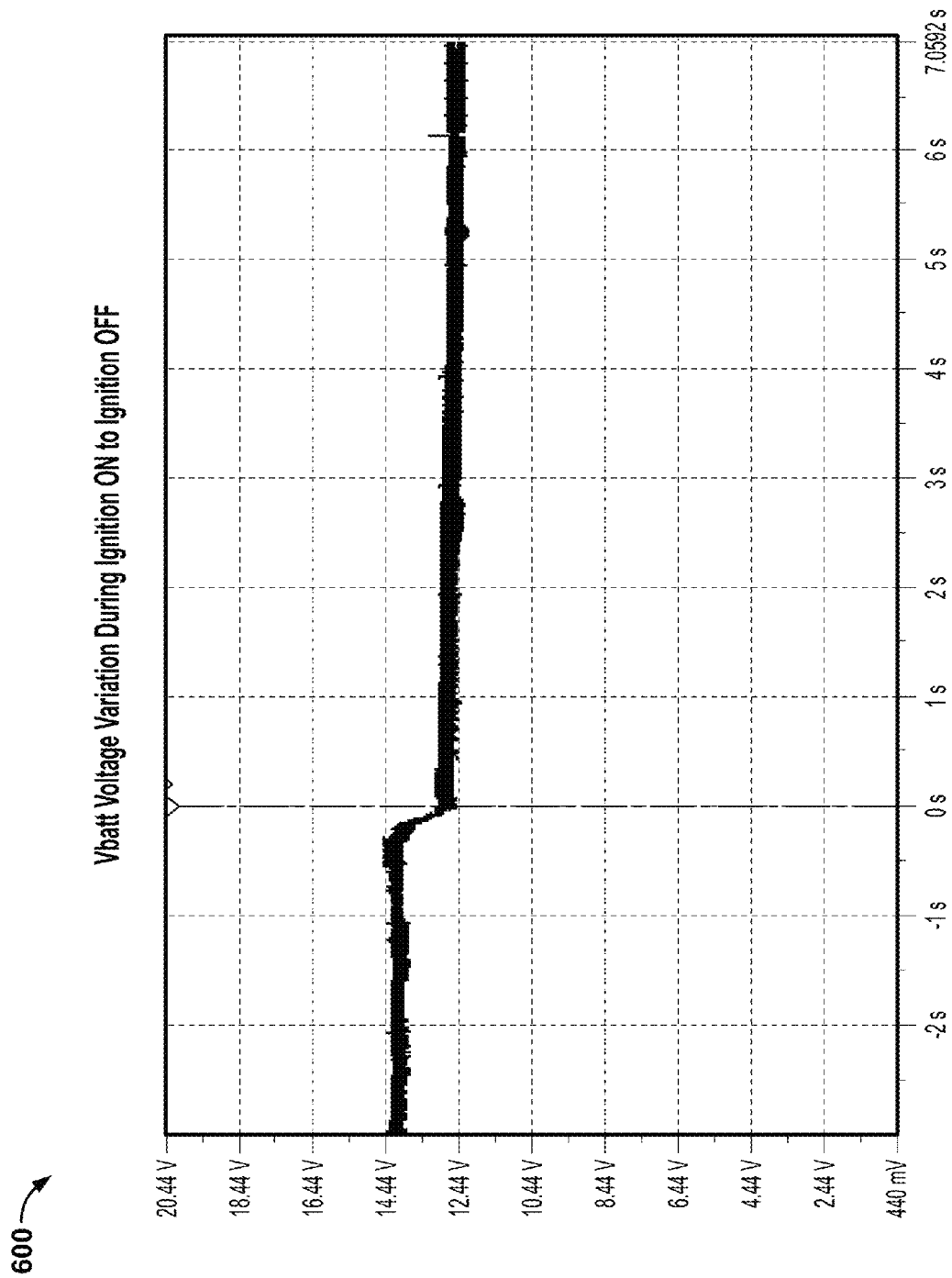
FIG. 8 is line graph of an example measured battery voltage during vehicle ignition turn off.

FIG. 7 illustrates an example measured battery voltage pattern 500 during an ignition turn on event. FIG. 8 illustrates an example measured battery voltage pattern 600 during an ignition turn off event. Example voltages and times are provided for purposes of illustration only, and other embodiments may have any other suitable voltage changes, speed of voltage changes, etc.

Figure 9B:
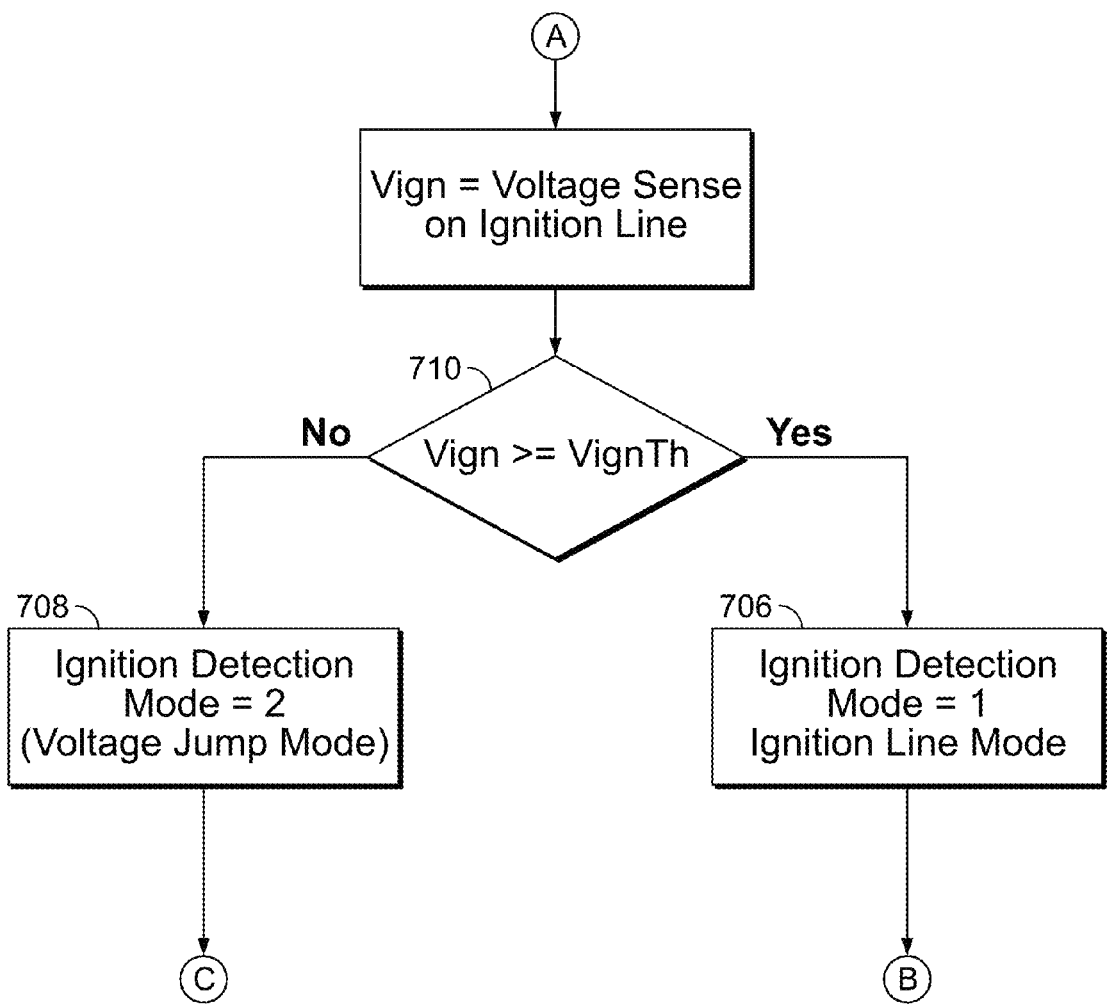

FIGS. 9A-9D illustrate an example method 700 for detecting ignition turn on and turn off events. The example method 700 may be implemented in any suitable telematics device, including the example devices described herein. As shown in FIG. 9A, the method first determines what detection mode a telematics device is configured to implement, at 702. The telematics device may be configured for an automatic detection mode 704, in which the device will detect whether there is a connection to an ignition line or not. The telematics device may be in an ignition line mode 706 where it is known that the telematics device is connected to the ignition line of the vehicle. The telematics device may be in a voltage jump mode 708 where it is known that the telematics device is not connected to an ignition line of the vehicle. The detection mode may be selected by a user, be implemented in computer-executable instructions, be remotely configurable by a remote entity (e.g., server, short message service (SMS) gateway, etc.), etc.

FIG. 9B illustrates the automatic detection mode 704. In the automatic detection mode 704, the telematics device senses a voltage at the ignition wire input of the telematics device. If the sensed ignition voltage (Vign) is greater than or equal to a threshold (VignTh) at 710, the telematics device determines that it is connected to ignition line of the vehicle and enters ignition line mode 706. If the sensed ignition voltage is not greater than a threshold, the telematics device determines that it is not connected to the ignition line of the vehicle and enters voltage jump mode 708.

Figure 9C:
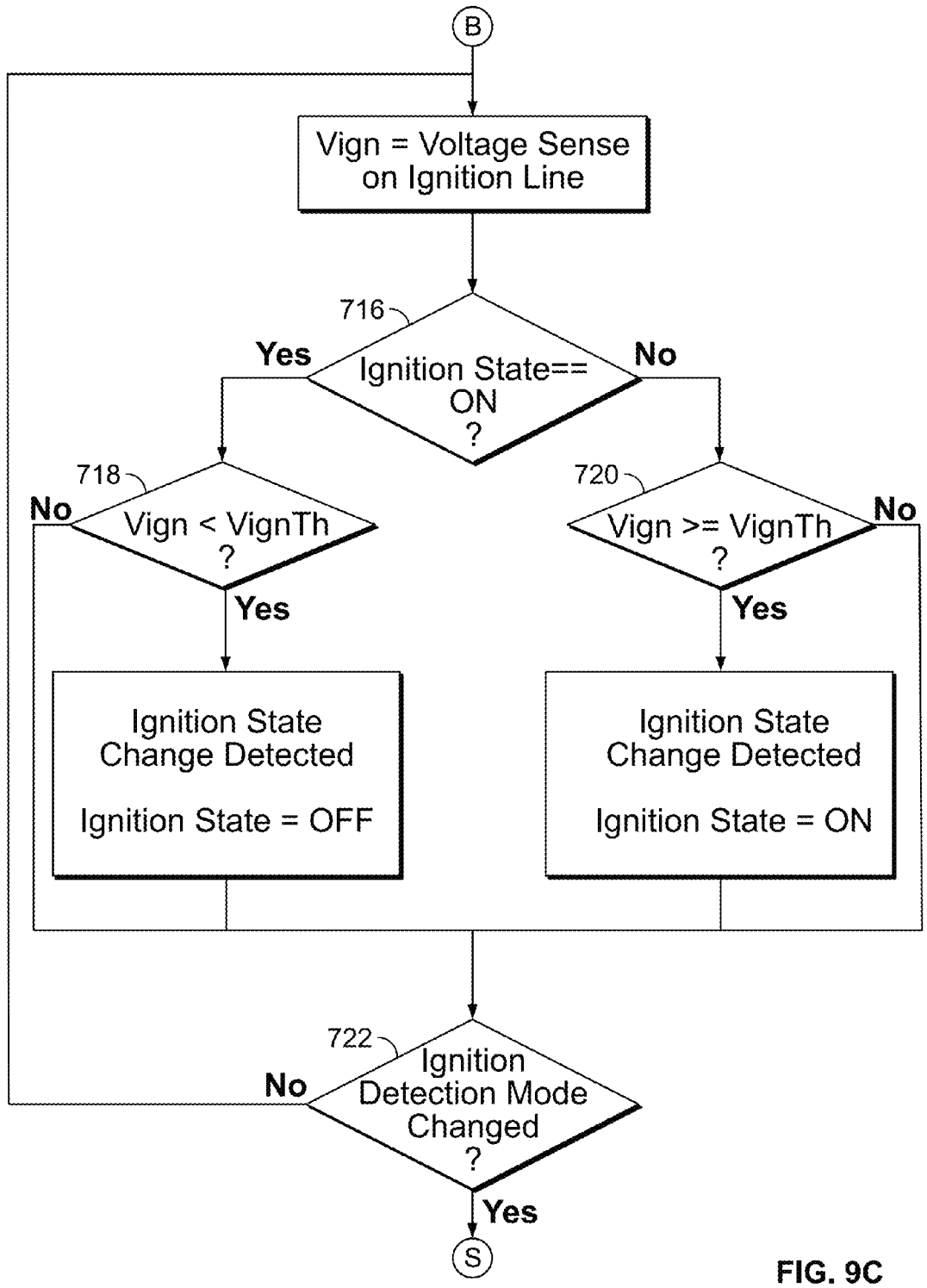

FIG. 9C illustrates the ignition line mode 706. The telematics device senses the voltage of the ignition line (Vign), and determines whether the ignition state is on or off at 716. If the ignition is on, the telematics device determines whether the sensed ignition voltage (Vign) is less than a threshold (VignTh) at 718. If the sensed ignition voltage is less than the threshold and ignition change is detected and the ignition state is changed to off.

If the ignition state is off the telematics device determines whether the sensed ignition voltage (Vign) is greater than or equal to the threshold (VignTh) at 720. If the sensed ignition voltage is greater than or equal to the threshold, an ignition state change is detected and the ignition state is changed to on.

At 722, the telematics device determines whether the ignition detection mode had changed. If the detection mode has not changed, the telematics device again senses the voltage at the ignition line. If the ignition detection mode has changed, the telematics device returns to step 702 of FIG. 9A.

Figure 9D:
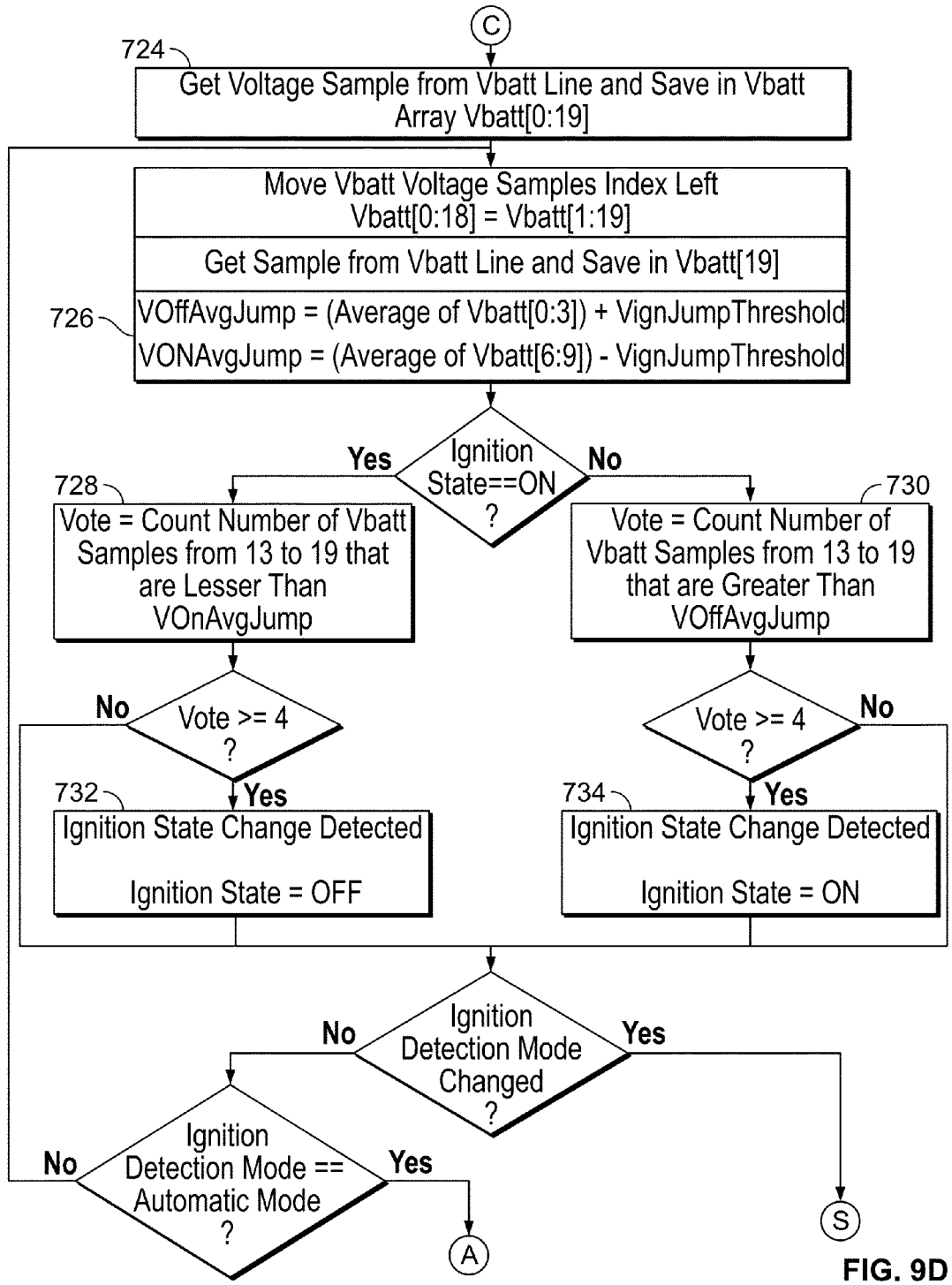

FIG. 9D illustrates the voltage jump detection mode 708. In the voltage jump detection mode, the telematics device periodically senses the battery voltage and stores the sensed battery voltage in an array, at 724. The array may be a moving window array that stores the most recent sensed battery voltages and updates the array on a periodic basis. For example, the array may include multiple slots each indicating a sensed battery voltage sample. In some embodiments, each slot may be an average of multiple sensed battery voltages at periodic intervals. In one embodiment, each slot includes an average of eight sensed battery voltages at 250 millisecond intervals. Accordingly, each slot is about two seconds in duration. In another embodiment, each slot may include an average of sixteen sensed battery voltages at about 160 millisecond intervals. Accordingly, each slot may be about 2.56 seconds in duration. It should be apparent that other embodiments may use any suitable number of slots, intervals per slot, length of intervals, etc.

As described above, after a period of time corresponding to each slot (e.g., after a number of interval samples are averaged and assigned to a slot, etc.) the array may be updated to store the most recent battery voltage sample in the most recent slot of the array. Each previous voltage sample slot is shifted and the oldest slot is discarded, such that the array is continuously updated with the most recent slots. The array may store any suitable number of battery voltage slots (e.g., about twenty slots, etc.).

The telematics device then calculates, at 726, one or more previous average battery voltages for determining whether an ignition turn on event has occurred. For example, the four oldest battery voltage slots (e.g., array values 0 through 3, etc.) may be averaged to determine a previous average battery voltage (VOffAvgJump) for determining whether the ignition has transferred from off to on. More recent battery voltage slots (e.g., array values 6 through 9) may be averaged to determine a previous battery voltage (VOnAvgJump) for determining whether the ignition has transferred from on to off. In other embodiments, different slot ranges may be used for calculating a previous average battery voltage. The previous average battery voltage (e.g., a prior steady state battery voltage, etc.) may provide a baseline for comparing against recent battery voltage slots to determine whether a voltage change (and possible ignition turn on or off event) has occurred.

The telematics device then determines whether the ignition state is on or off. If the ignition is off, the telematics device compares, at 730, a plurality of the most recent battery voltage slots to the previous average battery voltage (VOffAvgJump) and counts how many of the most recent battery voltage slots are greater than the previous average battery voltage by at least a voltage threshold (VignJumpThreshold). If a threshold number (e.g., Vote≥=4, etc.) of the most recent slots are above the previous average battery voltage by at least the voltage threshold, the telematics device determines that an ignition turn on event has occurred at 734.

In the example of FIG. 9D, the telematics device compares each of the seven most recent battery voltage slots (e.g., array values 13 to 19) to the previous average battery voltage (VOffAvgJump). If four or more of the most recent battery voltage slots are above the previous average battery voltage by at least the threshold (VignJumpThreshold), the device determines that an ignition turn on event has occurred. Any suitable voltage threshold may be used (e.g., 0.5 volts, 1 volt, etc.).

Similarly, if the ignition state is on, the telematics device compares, at 728, a plurality of the most recent battery voltage slots (e.g., array values 13 to 19) to the previous average battery voltage (VOnAvgJump) and counts how many of the most recent battery voltage slots are less than the previous average battery voltage by the voltage threshold (VignJumpThreshold). If a threshold number (e.g., Vote≥=4, etc.) of the most recent slots are below the previous average battery voltage by at least the voltage threshold, the telematics device determines that an ignition turn off event has occurred at 732.

In this manner, transients (e.g., voltage ripples that may occur while the ignition is on, immediately after ignition turn on, etc.) may be accounted for by looking at an average of older slots to determine a previous steady state value of the battery voltage. As shown in FIG. 9D, different slots may be used to determine the previous battery voltage average when determining ignition turn on events and turn off events. For example, the oldest four slots (e.g., array values 0 through 3, etc.) are averaged when determining whether an ignition turn on event has occurred, while the more recent older slots (e.g., array values 6 through 9) are used when determining whether a turn off event has occurred. This difference may correspond to the length of time for the battery voltage to change during ignition turn on events and ignition turn off events. In other embodiments, the averaged slots may be the same for each condition, more or less older slots may be averaged, etc.

Comparing multiple of the most recent battery voltage slots to the previous battery voltage average (e.g., steady state battery voltage, etc.) may also reduce the effects of transients. For example, comparing each of the seven most recent slots individually to the older previous battery voltage average and counting how many of the recent slots exceed the older average by a threshold reduces the chance of catching false transient errors. If a sufficient number of the most recent slots are above the older average by a threshold, it is more likely that the ignition has actually been turned on and a transient is not being falsely detected. In other embodiments, more or less than seven recent slots may be compared and counted, more or less than four of the slots may be required to exceed the threshold to identify an ignition state change, etc.

According to another example embodiment, a telematics device includes a controller and a wireless communication module coupled to the controller. The wireless communication module may be any suitable module capable of transmitting ignition information (e.g., ignition turn on events, ignition turn off events, ignition states, etc.) to a remote station. For example, the wireless communication module may be a cellular modem, etc.

The telematics device also includes a power input terminal configured to couple to a battery of a vehicle to sense a voltage of the battery, an ignition input terminal configured to couple to an ignition line of the vehicle, and a ground terminal configured to couple to a ground of the vehicle. For example, the terminals may be connected to on-board diagnostics (OBD) ports of the vehicle.

The telematics device may include a location sensor (e.g., global positioning system (GPS) receiver, etc.) configured to determine a location of the telematics device, a speed of the telematics device, etc. The telematics device may include a motion detector (e.g., accelerometer, etc.) configured to detect motion (e.g., acceleration, etc.) of the telematics device. Accordingly, the telematics device may be configured to detect location, speed, acceleration, etc. of a vehicle to which the telematics device is connected.

The telematics device may be configured to determine vehicle ignition events based on one or more of a sensed battery voltage, sensed speed of the vehicle, sensed location of the vehicle, sensed acceleration of the vehicle, etc. The telematics device may determine a vehicle ignition event when one or more criteria are satisfied.

When determining an ignition turn on event, the telematics device may determine whether the speed of the device has increased above a speed increase threshold for a sufficient speed increase duration. For example, if the speed has increased above 15 kilometers per hour for at least five seconds, the device may determine that the ignition has turned on because the vehicle has been moving for a sufficient period. Similarly, an ignition turn off event may be detected if the speed of the device decreases below a speed decrease threshold (e.g., below 10 kilometers per hour, etc.) for at least a speed decrease duration (e.g., at least five minutes, etc.). Other embodiments may include any other suitable speed increase thresholds, speed increase durations, speed decrease thresholds, speed decrease durations, etc.

An ignition turn on event may be determined when an acceleration of the vehicle is detected above an acceleration threshold for an acceleration increase duration. For example, if an acceleration of the vehicle is detected for at least five seconds, the device may determine that the ignition has turned on because the vehicle has been moving for a sufficient period. Similarly, a decrease in acceleration below the acceleration threshold for at least an acceleration decrease threshold (e.g., five minutes, etc.) may indicate an ignition turn off event. Other embodiments may include different suitable acceleration thresholds, acceleration increase durations, acceleration decrease durations, etc.

An ignition turn on event may be determined when a location of the device has moved beyond a location threshold. For example, if the device moves more than 500 meters, the device may determine that an ignition turn on event has occurred because the vehicle has moved. Other embodiments may include other suitable location thresholds.

An ignition turn on event may be detected when a battery voltage has increased above a voltage increase threshold. For example, if the battery voltage increases by more than 0.5 volts, the device may determine that an ignition turn on event has occurred because the battery voltage has increased due to power generated by the alternator. Similarly, a decrease in battery voltage beyond a voltage decrease threshold (e.g., by more than 0.5 volts, etc.) may indicate an ignition turn off event. Other embodiments may include other voltage increase thresholds, voltage decrease thresholds, etc.

As described above, different combinations of criteria may be used to determine whether an ignition turn on or turn off event has occurred. For example, a transition from ignition on to ignition off may occur when either: a battery voltage decreases below a voltage decrease threshold and a speed decreases below a speed decrease threshold for at least a speed decrease duration; or an acceleration decreases below an acceleration threshold for at least an acceleration decrease threshold and a speed decreases below the speed decrease duration for at least a speed decrease duration. Combining different measurement criteria increases the reliability of the ignition turn event detection by reducing the chance of detecting false positive errors, and also allows for detection via different methods so that ignition events are not missed. As should be apparent, other embodiments may include any other suitable combinations of criteria.

A transition from ignition off to ignition on may occur when either: a battery voltage increases above a voltage threshold; or a speed increases above a speed increase threshold for at least a speed duration and an acceleration increases above an acceleration threshold for at least an acceleration increase threshold; or a location of the device moves by at least a location threshold and the acceleration increases above the acceleration threshold for at least the acceleration increase threshold. Other embodiments may include any other suitable combination of criteria indicative of ignition turn on events.

Any of the threshold values described herein may be configurable according to desired settings. The values may be configurable by a user, configurable by settings on the device, configurable remotely from a server, SMS gateway, etc. This may allow users to tune the threshold values to detect ignition events for the particular application, increase the reliability of correctly detecting ignition events, etc. Accordingly, embodiments described herein may allow the device to detect ignition events without a connection to the ignition line of the vehicle.

According to another example embodiment, an exemplary method of detecting vehicle ignition using a telematics device is disclosed. The telematics device includes a controller, a wireless communication module, a power input terminal configured to couple to a battery of a vehicle to sense a voltage of the battery, and an ignition input terminal configured to couple to an ignition line of the vehicle. The method includes determining whether the ignition input terminal is coupled to an ignition line of the vehicle. When the ignition input terminal is coupled to an ignition line of the vehicle, the method includes determining ignition turn on and ignition turn off events by detecting voltage changes on the ignition line. When the ignition input terminal is not coupled to an ignition line of the vehicle, the method includes sensing a voltage of a battery of the vehicle to determine ignition turn on and turn off events based on voltage changes of the battery.

Sensing a voltage of the battery may include repeatedly sensing a voltage sample of the battery after a time period, and storing the sensed voltages in slots of a moving array. The moving array may include about 20 slots, and each slot may include an average of about eight voltage samples taken at about 250 millisecond intervals.

The method may also include determining a prior battery voltage average by calculating an average of a plurality of the oldest slots in the array and comparing each of a plurality of the most recent slots to the prior battery voltage average. When a threshold number of the most recent slots are above the prior battery voltage average by at least an ignition turn on threshold, the method may include determining that an ignition turn on event has occurred. When a threshold number of the most recent slots are below the prior battery voltage average by at least an ignition turn off threshold, the method may include determining that an ignition turn off event has occurred. The prior battery voltage average may be an average of the four oldest slots, the plurality of most recent slots may include the most recent six slots, and the threshold number of the most recent slots may include at least four slots.

Aspects of the present disclosure also generally relate to starter overrides for telematics devices and corresponding methods. According to various aspects, exemplary embodiments are provided of telematics devices and exemplary corresponding methods. In an exemplary embodiment, a telematics device generally includes a controller and a location sensor coupled to the controller. The location sensor is configured to determine a location of the telematics device. The telematics device also includes a wireless communication module coupled to the controller. The wireless communication module is configured to transmit location information from the controller to a remote station and to receive commands from the remote station. The controller is adapted for coupling to a starter of a vehicle and is configured to disable starting of the vehicle when a disable command is received from the remote station and to enable starting of the vehicle when an ignition pattern is received at the controller.

According to additional aspects of the present disclosure, an exemplary method of controlling ignition of a vehicle via a telematics device is disclosed. The telematics device includes a controller configured to detect and transmit a location of the vehicle to a remote station and to receive commands from the remote station. The controller is coupled to a starter of the vehicle. The method includes receiving a disable command from the remote station, disabling starting of the vehicle, and, in response to receiving an ignition pattern, enabling starting of the vehicle.

According to another example embodiment, an exemplary method of controlling ignition of a vehicle via a telematics device is disclosed. The telematics device includes a controller configured to detect and transmit a location of the vehicle to a remote station and to receive commands from the remote station. The controller is coupled to a starter of the vehicle. The method includes receiving a disable command from the remote station, disabling starting of the vehicle, and, in response to receiving an ignition pattern, enabling starting of the vehicle.

The ignition pattern may include a number of ignition turn on and turn off cycles that is greater than or equal to a pattern threshold (e.g., five cycles, seven cycles, etc.). The number of ignition turn on and turn off cycles may occur within a threshold period of time (e.g., about twenty seconds, etc.). Each ignition turn on and turn off cycle may occur within a cycle time period threshold (e.g., about 100 milliseconds, about two seconds, etc.). The ignition pattern may be variable and may be updated via an ignition pattern update command (e.g., from a remote station, etc.).

Enabling starting of the vehicle may include enabling starting of the vehicle for only an override period (e.g., about 24 hours, etc.) when the ignition pattern is received at the controller. The method may further include disabling the starter when the override period expires.

In some embodiments, a second ignition pattern may be received at the controller. And, the method may further include, in response to receiving the second ignition pattern, enabling starting of the vehicle for only a second override period when the second ignition pattern is received at the controller, and disabling the starter when the second override period expires.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific numerical dimensions and values, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A telematics device, comprising:
   a controller;
   a wireless communication module coupled to the controller, the wireless communication module configured to transmit ignition information from the controller to a remote station;
   a power input terminal configured to couple to a battery of a vehicle to sense a voltage of the battery; and
   an ignition input terminal configured to couple to an ignition line of the vehicle;

wherein the controller is configured to:
    determine whether the ignition input terminal is coupled to an ignition line of the vehicle, by sensing a voltage of the ignition input terminal and determining whether the sensed ignition input voltage is above an ignition connection threshold, and when the sense ignition input voltage is above the ignition connection threshold, determining that the ignition input terminal is coupled to the ignition line of the vehicle;
    when the ignition input terminal is coupled to an ignition line of the vehicle, determine vehicle ignition turn on and ignition turn off events by detecting voltage changes on the ignition line; and
    when the ignition input terminal is not coupled to an ignition line of the vehicle, sense the voltage of the battery of the vehicle to determine vehicle ignition turn on and turn off events based on sensed voltage changes of the battery.

2. The telematics device of claim 1, further comprising a ground terminal configured to couple to a ground of the vehicle.

3. The telematics device of claim 2, wherein the power input terminal is configured to connect to an on-board diagnostics port of the vehicle to sense the voltage of the battery, and the ground terminal is configured to couple to an on-board diagnostics port of the vehicle.

4. The telematics device of claim 1, wherein the controller is configured to determine an ignition turn on event when a sensed battery voltage increases by an amount that is greater than an ignition turn on threshold.

5. The telematics device of claim 4, wherein the controller is configured to determine the ignition turn on event by:
    determining a prior battery voltage average by calculating an average of a plurality of previous voltage sample slots;
    comparing each of a plurality of most recent voltage sample slots to the prior battery voltage average; and
    when a threshold number of most recent voltage sample slots are above the prior battery voltage average by at least the ignition turn on threshold, determine that an ignition turn on event has occurred.

6. The telematics device of claim 5, wherein the ignition turn off threshold is 0.5 volts.

7. The telematics device of claim 4, wherein the ignition turn on threshold is 0.5 volts.

8. The telematics device of claim 1, wherein the controller is configured to determine an ignition turn off event when a sensed battery voltage decreases by an amount that is greater than an ignition turn off threshold.

9. The telematics device of claim 8, wherein the controller is configured to determine an ignition turn off event by:
    determining a prior battery voltage average by calculating an average of a plurality of previous voltage sample slots;
    comparing each of a plurality of most recent voltage sample slots to the prior battery voltage average; and
    when a threshold number of most recent voltage sample slots are below the prior battery voltage average by at least the ignition turn off threshold, determine that an ignition turn off event has occurred.

10. A method of detecting ignition events of a vehicle using a telematics device having a controller, a wireless communication module, a power input terminal configured to couple to a battery of a vehicle to sense a voltage of the battery, and an ignition input terminal configured to couple to an ignition line of the vehicle, the method comprising:
    determining whether the ignition input terminal is coupled to an ignition line of the vehicle;
    when the ignition input terminal is coupled to an ignition line of the vehicle, determining ignition turn on and ignition turn off events by detecting voltage changes on the ignition line; and
    when the ignition input terminal is not coupled to an ignition line of the vehicle, sensing a voltage of a battery of the vehicle to determine ignition turn on and turn off events based on voltage changes of the battery by:
        determining a prior battery voltage average by calculating an average of a plurality of the oldest slots in the array;
        comparing each of a plurality of the most recent slots to the prior battery voltage average; and
        when a threshold number of the most recent slots are above the prior battery voltage average by at least an ignition turn on threshold, determining that an ignition turn on event has occurred.

11. The method of claim 10, wherein sensing a voltage of the battery includes repeatedly sensing a voltage sample of the battery after a time period, and storing the sensed voltages in slots of a moving array.

12. The method of claim 11, wherein the moving array includes 20 slots, and each slot includes an average of eight voltage samples taken at 250 millisecond intervals.

13. The method of claim 12, further comprising:
    when a threshold number of the most recent slots are below the prior battery voltage average by at least an ignition turn off threshold, determining that an ignition turn off event has occurred.

14. The method of claim 10, wherein the ignition turn on threshold is 0.5 volts.

15. The method of claim 10, wherein the ignition turn off threshold is 0.5 volts.

16. The method of claim 10, wherein the telematics device includes a ground terminal configured to couple to a ground of the vehicle.

17. The method of claim 16, wherein the ground terminal is configured to couple to an on-board diagnostics port of the vehicle.

18. The method of claim 16, wherein the power input terminal is configured to connect to an on-board diagnostics port of the vehicle to sense the voltage of the battery.

19. The method of claim 10, wherein determining whether the ignition input terminal is coupled to an ignition line of the vehicle includes sensing by sensing a voltage of the ignition input terminal and determining whether the sensed ignition input voltage is above an ignition connection threshold, and when the sense ignition input voltage is above the ignition connection threshold, determine that the ignition input terminal is coupled to the ignition line of the vehicle.

20. A method of detecting ignition events of a vehicle using a telematics device having a controller, a wireless communication module, a power input terminal configured to couple to a battery of a vehicle to sense a voltage of the battery, and an ignition input terminal configured to couple to an ignition line of the vehicle, the method comprising:
    determining whether the ignition input terminal is coupled to an ignition line of the vehicle;
    when the ignition input terminal is coupled to an ignition line of the vehicle, determining ignition turn on and ignition turn off events by detecting voltage changes on the ignition line; and
    when the ignition input terminal is not coupled to an ignition line of the vehicle, sensing a voltage of a battery of the vehicle to determine ignition turn on and turn off events based on voltage changes of the battery by:

repeatedly sensing a voltage sample of the battery after a time period, and storing the sensed voltages in slots of a moving array, the moving array including 20 slots, and each slot including an average of eight voltage samples taken at 250 millisecond intervals;

determining a prior battery voltage average by calculating an average of a plurality of the oldest slots in the array;

comparing each of a plurality of the most recent slots to the prior battery voltage average;

when a threshold number of the most recent slots are above the prior battery voltage average by at least an ignition turn on threshold, determining that an ignition turn on event has occurred; and when a threshold number of the most recent slots are below the prior battery voltage average by at least an ignition turn off threshold, determining that an ignition turn off event has occurred;

wherein the prior battery voltage average is an average of the four oldest slots, the plurality of most recent slots includes the most recent six slots, and the threshold number of the most recent slots is at least four slots.

* * * * *